US009407954B2

(12) United States Patent
Bonvolanta (10) Patent No.: US 9,407,954 B2
(45) Date of Patent: Aug. 2, 2016

(54) METHOD AND APPARATUS FOR PROMOTIONAL PROGRAMMING

(71) Applicant: AT&T Intellectual Property I, LP, Atlanta, GA (US)

(72) Inventor: Anthony Bonvolanta, Chicago, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 238 days.

(21) Appl. No.: 14/061,472

(22) Filed: Oct. 23, 2013

(65) Prior Publication Data

US 2015/0113555 A1    Apr. 23, 2015

(51) Int. Cl.
*H04N 21/435* (2011.01)
*H04N 21/81* (2011.01)
*H04N 21/4725* (2011.01)
*H04N 21/858* (2011.01)

(52) U.S. Cl.
CPC ......... *H04N 21/435* (2013.01); *H04N 21/4725* (2013.01); *H04N 21/812* (2013.01); *H04N 21/8583* (2013.01)

(58) Field of Classification Search
CPC .. H04N 21/431; H04N 21/472; H04N 21/858
See application file for complete search history.

(56) References Cited

U.S. PATENT DOCUMENTS

| 5,794,210 | A  |     | 8/1998  | Goldhaber et al. |
|-----------|----|-----|---------|------------------|
| 6,282,713 | B1 |     | 8/2001  | Kitsukawa        |
| 6,968,006 | B1 |     | 11/2005 | Puri et al.      |
| 7,000,242 | B1 |     | 2/2006  | Haber            |
| 7,149,710 | B1 |     | 12/2006 | Edmark           |
| 7,269,643 | B2 |     | 9/2007  | Spaid            |
| 7,293,280 | B1 |     | 11/2007 | Gupta            |
| 7,444,659 | B2 |     | 10/2008 | Lemmons          |
| 7,925,743 | B2 |     | 4/2011  | Neely            |
| 8,424,052 | B2 |     | 4/2013  | Abed             |
| 8,910,201 | B1 | *   | 12/2014 | Zamiska .......... H04N 21/44222 725/34 |
| 2002/0083469 | A1 |  | 6/2002  | Jeannin          |

(Continued)

FOREIGN PATENT DOCUMENTS

KR        20030037130        5/2003

OTHER PUBLICATIONS

"ebay", www.ebay.com; Jun. 28, 2011.

(Continued)

*Primary Examiner* — Omar S Parra
(74) *Attorney, Agent, or Firm* — Atanu Das; Guntin & Gust, PLC (57) ABSTRACT

A method that incorporates teachings of the subject disclosure may include, for example, receiving a product placement event that is triggered by a placement stamp in a media program. The placement stamp may identify an occurrence of a product in the media program, where the occurrence is not an explicit advertisement. The method further may include searching a product description database according to a product identifier of the product placement event and receiving product advertising information matching the product identifier in an entry of the product description database. The product description database may have been updated, and the product advertising information may differ from what the product advertising information would have been if the product description database had not been updated. The method may further include presenting a product advertisement according to the product advertising information. Other embodiments are disclosed.

20 Claims, 7 Drawing Sheets

(56) References Cited

U.S. PATENT DOCUMENTS

| | | |
|---|---|---|
| 2003/0033192 A1 | 2/2003 | Zyman |
| 2004/0019524 A1 | 1/2004 | Marshall |
| 2004/0116183 A1 | 6/2004 | Prindle |
| 2004/0167814 A1 | 8/2004 | Hawks |
| 2005/0021398 A1 | 1/2005 | McCleskey et al. |
| 2005/0229227 A1 | 10/2005 | Rogers et al. |
| 2006/0089843 A1 | 4/2006 | Flather |
| 2006/0230123 A1 | 10/2006 | Simmons |
| 2006/0282319 A1 | 12/2006 | Maggio |
| 2006/0288374 A1 | 12/2006 | Ferris et al. |
| 2007/0089157 A1 | 4/2007 | Clark |
| 2007/0107021 A1 | 5/2007 | Angel |
| 2007/0198510 A1 | 8/2007 | Ebanks |
| 2007/0276726 A1 | 11/2007 | DiMatteo |
| 2008/0015933 A1* | 1/2008 | McKenna ............... G06Q 30/02 705/14.61 |
| 2008/0071594 A1 | 3/2008 | Morin |
| 2008/0098425 A1 | 4/2008 | Welch |
| 2008/0246759 A1 | 10/2008 | Summers |
| 2008/0255961 A1 | 10/2008 | Livesey et al. |
| 2008/0306830 A1 | 12/2008 | Lasa |
| 2008/0310731 A1 | 12/2008 | Stojancic et al. |
| 2009/0063991 A1 | 3/2009 | Baron et al. |
| 2009/0064219 A1 | 3/2009 | Minor |
| 2009/0089830 A1 | 4/2009 | Chandratillake et al. |
| 2009/0132342 A1 | 5/2009 | Klinger et al. |
| 2009/0167870 A1 | 7/2009 | Caleca |
| 2010/0076851 A1 | 3/2010 | Jewell |
| 2010/0131385 A1 | 5/2010 | Harrang |
| 2010/0138478 A1 | 6/2010 | Meng |
| 2010/0162288 A1 | 6/2010 | Huffman |
| 2010/0179874 A1 | 7/2010 | Higgins et al. |
| 2010/0228631 A1 | 9/2010 | Zhang |
| 2011/0093336 A1 | 4/2011 | Calabria |
| 2011/0106618 A1 | 5/2011 | Ben-Moshe |
| 2011/0142417 A1 | 6/2011 | Wilson et al. |
| 2011/0251898 A1 | 10/2011 | Scott et al. |
| 2011/0264523 A1 | 10/2011 | Scott et al. |
| 2011/0264528 A1 | 10/2011 | Whale |
| 2011/0270685 A1 | 11/2011 | Marks et al. |
| 2011/0307481 A1 | 12/2011 | Leite et al. |
| 2011/0321083 A1 | 12/2011 | Rouse et al. |
| 2012/0022947 A1 | 1/2012 | Esprey |
| 2012/0232956 A1 | 9/2012 | Dilip et al. |
| 2012/0266197 A1* | 10/2012 | Andrews, II ........... G06Q 30/02 725/60 |
| 2012/0297417 A1 | 11/2012 | Philpott et al. |
| 2013/0019261 A1 | 1/2013 | Huber et al. |
| 2015/0206348 A1* | 7/2015 | Koreeda ............. H04N 21/4725 345/633 |

OTHER PUBLICATIONS

"Facebook", www.facebook.com; Jun. 28, 2011.
"Google AdSense", www.google.com/adsense; Jun. 28, 2011.
"Myspace", www.myspace.com; Jun. 28, 2011.
"Priceline.com", vvww.priceline.com; Jun. 28, 2011.

\* cited by examiner

METHOD AND APPARATUS FOR PROMOTIONAL PROGRAMMING

FIELD OF THE DISCLOSURE

The subject disclosure relates to a method and apparatus for promotional programming.

BACKGROUND

Modern telecommunications systems allow consumers to access a large variety of content from mobile communication devices. Consumers are no longer bound to specific locations when communicating with others or when enjoying content, including video programming Network capabilities have expanded and have created additional interconnections and new opportunities for using mobile communication devices in a variety of situations. Intelligent devices offer new means for the enjoyment of network interactions in ways that anticipate consumer desires. Media distribution capabilities provide opportunities for flexible promotion of goods and services.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for receiving a selection of a media program at a media processor. A product placement database can be searched, based on the media program and air date, to determine a time stamp of a product that has been placed into the media program for promotional purposes. A product placement event can be triggered when the timestamp is reached and can cause access to a product description database for presenting an advertisement for the product. Other embodiments are included in the subject disclosure.

One embodiment of the subject disclosure includes a device comprising a memory to store executable instructions and a processor. The processor, responsive to executing the executable instructions, can perform operations including receiving a product placement database from a network. The processor can perform operations for receiving a selection of a media program from a user interface. The processor can further perform operations for searching the product placement database for a program identifier associated with the media program and, in turn, for accessing a placement stamp and a product identifier from the product placement database responsive to matching the program identifier. The processor can perform operations comprising receiving a data stream of the media program from the network and detecting the placement stamp in the data stream. The processor can perform operations comprising generating a product placement event comprising the product identifier according to the detecting of the placement stamp. The processor can further perform operations comprising accessing product description information at a product description database of the network according to the product identifier and, in turn, presenting a product advertisement at a display according to the product description information.

One embodiment of the subject disclosure includes a computer-readable storage device, comprising executable instructions. The executable instructions can cause a processor to perform operations comprising searching a product placement database for a program identifier associated with a selected media program. The executable instructions can also cause the processor to perform operations comprising accessing a placement stamp and a product identifier from the product placement database responsive to matching the program identifier. The executable instructions can further cause the processor to perform operations comprising detecting the placement stamp in a data stream representing the media program and, in turn, generating a product placement event comprising the product identifier according to the detecting of the placement stamp. The executable instructions can cause the processor to perform operations comprising transmitting a message comprising the product placement event to a communication device. The communication device can access product description information at a product description database according to the product identifier can present a product advertisement according to the product description information.

One embodiment of the subject disclosure includes a method including receiving, by a system comprising a processor, a product placement event message from a media processor device. The product placement event can comprise a product identifier and can be triggered by an occurrence of a placement stamp in a media program at the media processor device. The method can include searching, by the system, a product description database at a network for product description information according to the product identifier. The method can further include accessing, by the system, a product advertisement responsive to matching the product identifier and, in turn, presenting, by the system, the product advertisement according to the product description information.

Figure 1:
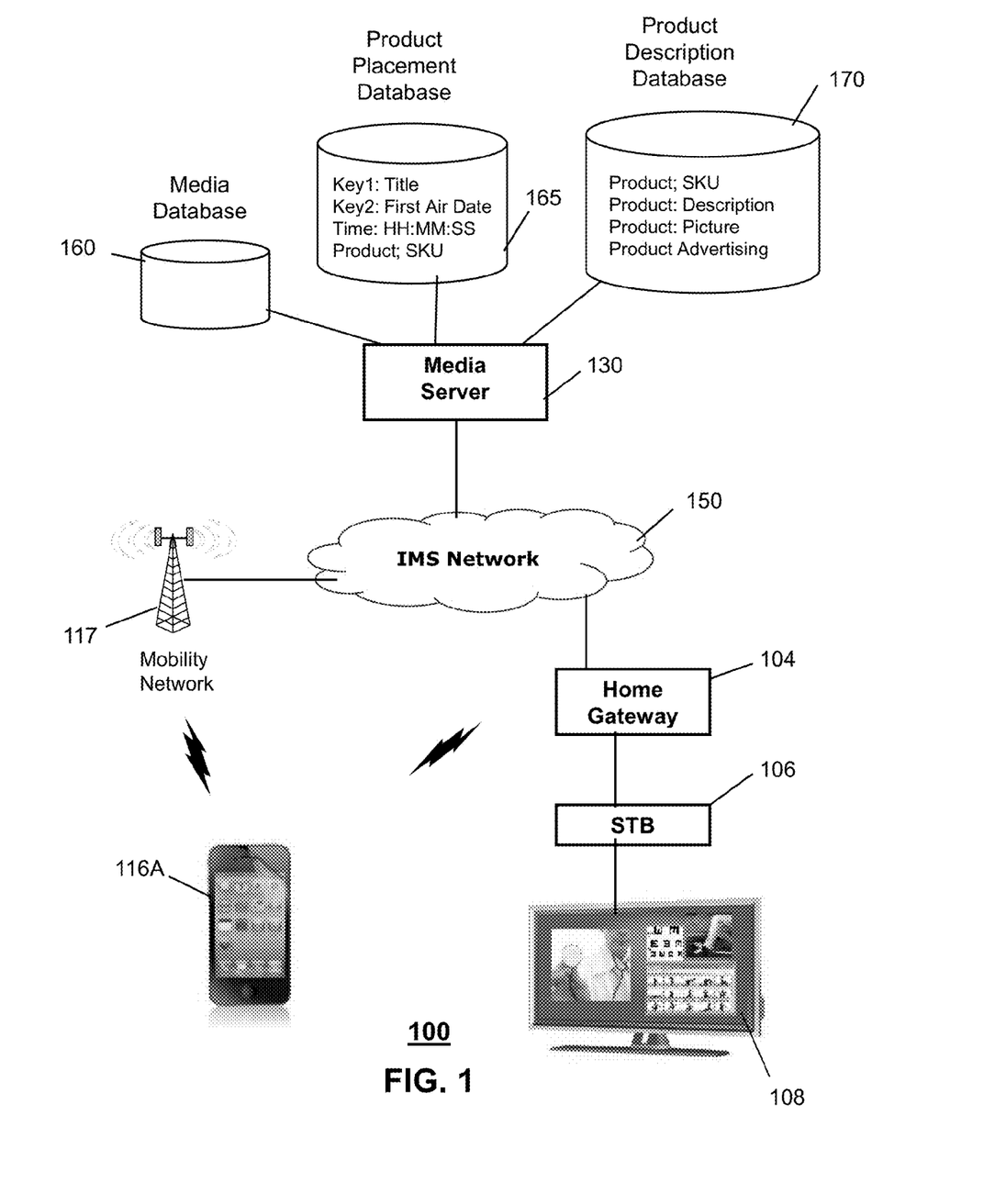
FIG. 1 depicts illustrative embodiments of a system that can be utilized for providing promotional opportunities via a media service provider network, where products are placed into media content and linked to product advertising via databases.
Figure 2:
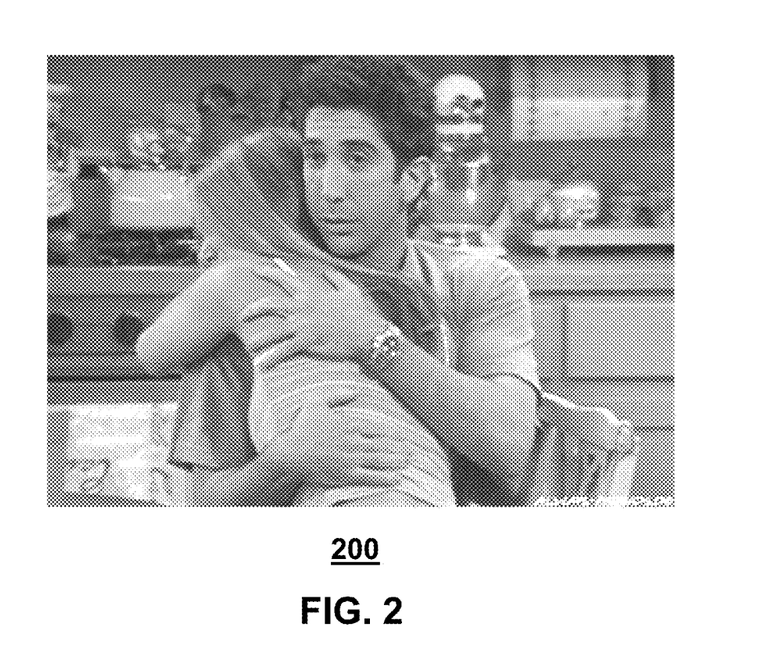
FIGS. 2-3 depict exemplary images illustrating, in part, media programming generated according to the systems of FIGS. 1, 5, and 6, and the method of FIG. 2.
Figure 3:
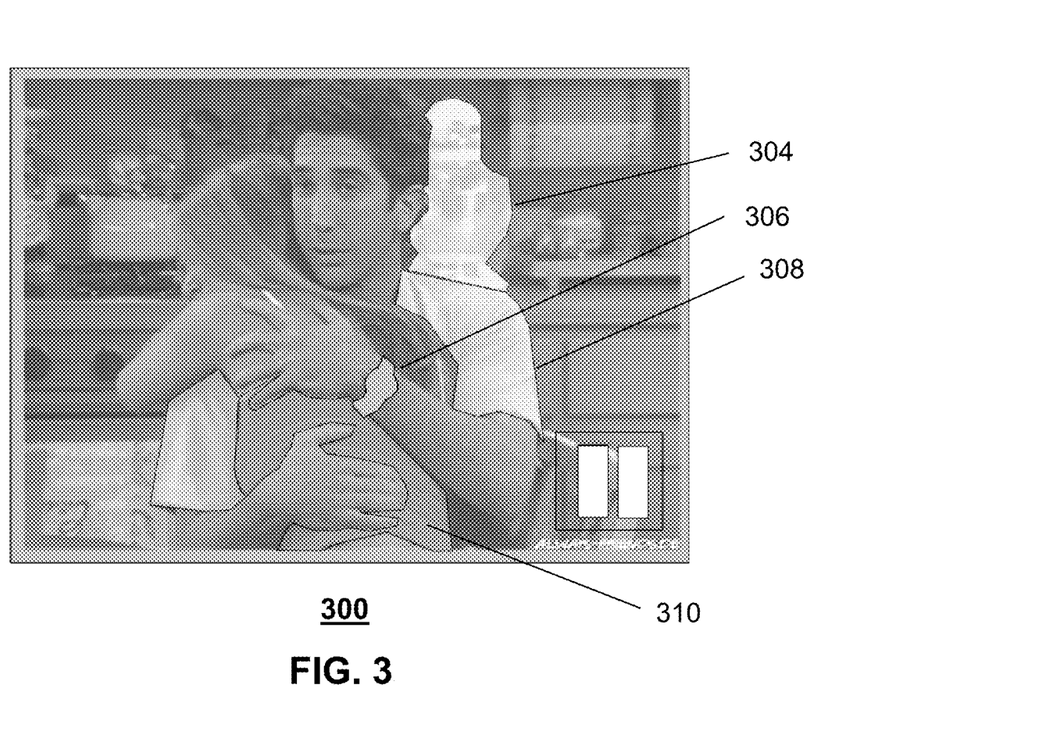

FIG. 1 depicts an illustrative embodiment of a system 100 that can be utilized for presenting promotional information in conjunction with a media program. FIGS. 2-3 depict exemplary images illustrating, in part, media programming generated according to the systems of FIG. 1. The system 100 can be used for selecting a media program from a service provider at a media processor device 106. Data from a product placement database 165 can be searched, based on the media program and air date, to determine a time stamp of a product that has been placed into the media program for promotional purposes. A product placement event can be triggered when the timestamp is reached and can cause access to a product description database 170 for presenting an advertisement for the product that has been placed into the media program.

In one embodiment, the system 100 can include a communication network 150. The system 100 can include a subscription telecommunication service, such as an Internet. Protocol Multimedia Subsystem (IMS) network 150 for providing cellular/mobile communications, Internet access, and content to mobile communication devices 116 via a mobility network of mobile base stations 117. The system can include a subscription content service, such as an Internet Protocol Television (IPTV) network for providing media content to subscribers. The IPTV network can be part of a cable, satellite, or DSL based media content delivery system. The media content can be any type of viewable content, such as broadcast television, cable or premium television, video on demand, or pay-per-per view television. The IPTV network can deliver media content to media processing devices 106 and media display devices 108 at subscriber locations via gateway devices 104.

In one embodiment, the system 100 can include one or more servers 130 that are associated with the IMS network 150. In one embodiment, a media server 130 can communicate with media processor devices 106 and mobile communication devices 116 over the IMS network 150. The media server 130 can receive media content from a media database 160. The media processor devices 108 can receive media content from the media server 130 over the IMS network 150. The mobile communication device 116A can communicate with the IMS network 150 using one or more components of a mobility network 117, such as cellular base stations for receiving and transmitting wireless communication signals.

A media processor device 106 can communicate with a media server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming.

The media server 130 can provide a product placement database 165 to media processor device 106. The product placement database 165 is a database that stores searchable data associated with instances of product placement incorporated into media programs. In one embodiment, during production of a media program, producers of the program can intentionally include instances of products, including goods, services, logos, trademarks, and/or verbal references to products into the program. For example, during a movie, a character can be shown eating a commercially available candy or wearing a dress that is marketed at a national retailer. In one embodiment, the product instance can be accidental, such as in a crowd shot or B-roll, where the producers or distributors of the media program discover the product after the fact and wish to take advantage of this opportunity. In one embodiment, the product instance is not a literal placement but, rather, a program scenario that is simply conducive to subconsciously calling the product to mind. For example, characters in a situational comedy can be discussing an upcoming vacation. This scenario can be useful for a figurative product "placement" of a travel/accommodation website. For example, scenario-based placements can be based around plot devices, characters, dialog, and/or scenic locations.

In one embodiment, the product placements are not explicit advertisements. Rather, the product placements are references to or images of products within the media program that appear incidentally to the program. For example, explicit advertisements include commercials, such as those that are typically show between segments of media programming on commercial broadcast television stations. Explicit advertisements also include statements or images, during a media program, with sponsor identification descriptions, such as, "This game is sponsored by X." Product placements, by contrast, are images or references that occur incidentally and are not acknowledge or described in the media program as sponsors or advertisers. FIGS. 2-3 depict exemplary images illustrating, in part, media programming having product placements. An exemplary scene 200 shows two actors embracing in a situation comedy. No explicit advertising is shown or referenced by the actors in the scene. However, the same scene 300 can contain one or more product placement opportunities. For example, the actor's watch 306 and shirt 308, the actress's shirt 310, and/or the kitchen appliance 304 can be placed into, or recognized as present within, the scene. Each product placement 304-310 represents a marketing opportunity to exploit non-explicit advertising.

In one embodiment, the product placement database 165 is used for linking specific media programs to product placement promotional activities. To this effect, the product placement database 165 can provide information for identifying if a particular media program is a subject of product placement. The product placement database 165 can provide a placement stamp, or time stamp, within the media program, where the product placement occurs. The product placement database 165 can provide a product identifier for identifying the particular product that is subject to the promotional placement event.

In one embodiment, the product placement database 165 can include program identifiers or keywords. For example, the product placement database 165 can include a title of a media program. The title can correspond to a complete title (e.g., "Saturday Night Live"), a partial title (e.g., "Saturday Night"), an abbreviated title (e.g., "SNL"), or other unique title associated with the media program. In other embodiments, the title can be a wildcard (e.g., "*Live") or a keyword (e.g., "Night"). In other embodiments, the title can be a channel (e.g., "25-NBC") or a subject matter (e.g., "sketch comedy"). The product identifier can include a first air date or, simply, an air date for the media program. The air date can further specify the media program to a specific occurrence or version of the program. By combining a Title with a first air date, a specific episode or broadcast version of a media program can be identified. In one embodiment, a program identifier can include an episode title or a production date for the program, which can facilitate identification of a particular version of the media program.

In one embodiment, the product placement database 165 can include a placement stamp, or time stamp. The placement stamp identifies a location within the media program of a product placement. For example, the placement stamp can indicate that the product placement occurs at a run time location of "01:23:43" or 1 hour, 23 minutes, and 43 seconds from the beginning of the program. The placement stamp can provide an absolute time point in the program or a relative time point. The placement stamp can reference a non-time based location, including the beginning of the program, the midpoint of the program, or the end of the program.

In one embodiment, the product placement database 165 can include a product identifier. For example, the product identifier can include a stock keeping unit (SKU) number or a universal product code (UPC) number that references the product (e.g., "038000845222" SKU/UPC number for Pringles™ Potato Chips). The product identifier can be text or a combination of text and numbers that identify the product. In one embodiment, a product can be subject to multiple promotions. In this case, the product identifier can specify a specific promotional version (e.g., "Starbucks™ Coffee—Promo 2").

In one embodiment, the media server 130 can transmit data associated with the product placement database 165 to the media processor device 106. For example, the media processor device 106 can periodically request a download or an update of all or part of the data of the product placement database 165. The data from the product placement database 165 can be transmitted to the media processor device 106 in conjunction with an update of the electronic programming guide information. In one embodiment, data from the product placement database 165 can be included with the electronic programming guide information. When the media processor device 106 requests an update of the electronic programming guide information, then the data from the product placement database 165 can be updated in whole or in part.

In one embodiment, the media processor device 106 can search the data of the product placement database 165 that has been downloaded onto the media processor device 106. The media processor device 106 can determine if a program identifier for the selected media program matches a program identifier in the data of the database 165 at the media processor device 106. If a match is found, then the media processor device can further determine if the current date (or a date for recording the media program) matches the air date of the database 165 at the media processor device 106. If the media processor device 106 matches the media program title and air date, then the media processor device 106 can access records for the matched media program, including a placement stamp and a product identifier.

In one embodiment, the media processor device 106 can determine, prior to searching the data of the product placement database 165, if the product placement database 165 is up to date. For example, the media processor device 106 can query the product placement database 165 for the latest revision date or code and can compare the returned information to the current data from the product placement database 165 that is stored at the media processor device 106. If the product placement database 165 has been updated, then the media processor device 106 can download the updated data. This feature allows the product placement database 165 to be updated at the network level without changing the media program. For example, a media program can released to the service provider for distribution via the media server 130. If the media program includes a product placement, then data can be entered into the product placement database 165 for use by media processor devices 106 that subsequently receive the media program. If at a later time, an additional product placement opportunity is discovered in the media program, then the product placement data base 165 can be updated, at the system level, to cause the media processor devices 106 to detect the additional product stamp and to display promotional material based on that product stamp.

For example, a media program can be released with a direct product placement for a soft drink at a first time stamp. A character walks across the screen carrying the soft drink during a cafeteria scene. This first product placement can be entered into the product placement database 165 such that media processor devices 106 receiving the media program will recognize the time stamp, generate a product placement event, and cause advertisement material to be presented. At a later time, a second opportunity for product placement is chosen, where a character mentions his plans for a trip to Hawaii. A timestamp is defined for this indirect product placement that can be used to promote a travel website. In one embodiment, the second product placement entry can replace the first entry in the product placement database 165. This will cause subsequent viewers at the media processor devices 106 to see only the second advertisement material for the travel website. In one embodiment, the second product placement entry can be added to the product placement database 165. This will cause subsequent viewers to see both advertisements, one for the soft drink and one for the travel website.

In one embodiment, the product placement database 165 can be accessed by the media server 130, which can perform the search of the product placement database 165. After the media processor device 106 sends the request for the selected media program, the media server 130 can determine if a program identifier for the selected media program matches a program identifier in the product placement database 165 at the media server 130. If a match is found, the media server 130 can further determine if the current date (or a date for recording the media program) matches the air date in the product placement database 165 at the media server 130. If the media server 130 matches the media program title and air date, then the media server 130 can return records to the media processor device 165 for the matched media program, including a placement stamp and a product identifier.

In one embodiment, media server 130 can send a data stream representing the media program to the media processor device 106. The data stream can be part of multiple data streams that can be routed from the media server 130 to multiple devices in the network 100. The media processor device 106 can receive the data stream and decode the data stream for presentation at the media device 108. In one embodiment, the media processor device 106 can store the data stream in memory if, for example, it has been instructed to record the selected media content at a digital video recorder.

In one embodiment, the media processor device 106 can decode the data stream live from the media server 130 or recorded from the DVR. If it has been determined that media program contains a product placement, then the media processor device 106 can compare a placement stamp (or time stamp) that was received from the product placement database 165 with a tracked running time for the reproduced media program. The media processor device 106 can determine if the media program has reached the time point, or location, for the product placement.

In one embodiment, when the media processor device 106 determines that media program has reached the product placement point, then the media processor device 106 can generate a product placement event. The product placement event can include a product identifier that was received from the product placement database 165. In one embodiment, the media processor device 106 sends a product placement event message to an application at the media processor device 106 that handles product placement events. In one embodiment, the product placement event handler can, in turn, send a message to a mobile communication device 116A to notify the mobile communication device 116A of the product placement event. In one embodiment, the product placement event handler can, in turn, call an application at the media processor device 106 to present a promotional advertisement for the product at the media processor device 106.

In one embodiment, when a message is sent to the mobile communication device 116A by the product placement event handler, the mobile communication device 116A can access a product description database 170. The mobile communication device 116A can send a message to the media server 130 requesting a search of the product description database 170. The message can include the product identifier that was obtained from the product placement database 165. The media server 130, acting on the request, can search the product description database 170 using the product identifier. If the search finds the product identifier in the product description database 170, then the database 170 can return a product description and/or a product picture to the media communication device 116A. The product description can include a uniform resource locator (URL) for a website that can present promotional information associated with the product. The website can be presented at the mobile communication device 116A. The product description can include video information that can be presented at the mobile communication device 116A. The media communication device 116A can present a product advertisement or promotional event based on the URL and/or video information.

In one embodiment, when the product placement event handler calls an application at the media processor device 106, the application can send a message to the media server 130 requesting a search of the product description database 170. The message can include the product identifier that was obtained from the product placement database 165. The media server 130, acting on the request, can search the product description database 170 using the product identifier. If the search finds the product identifier in the product description database 170, then the database 170 can return a product description and/or a product picture to the application at the media processor device 106. The product description can include a uniform resource locator (URL) for a website that can present promotional information associated with the product. The website can be presented at the media processor device 106. The product description can include video information that can be presented at the media processor device 106. The media processor device 106 can present a product advertisement or promotional event based on the URL and/or video information.

In one embodiment, the product description database 170 can be updated at the system level independent from the both media program and the product placement database 165. For example, when a media program with a product placement is released for distribution by the media server 106, then data can be entered into the product description database 170 corresponding to the promotional materials that will be presented to a viewer at the time of a product placement event. At a later time, however, the promotional materials that are associated with the placement event can be changed or updated. For example, when the product placement is first released, the promotion can be a sale that runs for a limited period. At the end of the period, the product description database 170 can be updated to cause a different promotion or a different sale date to be generated at the placement event. By allowing the product description database 170 to be updated independently, the promotion material can be kept fresh and relevant.

Upon reviewing the aforementioned embodiments, it would be evident to an artisan with ordinary skill in the art that said embodiments can be modified, reduced, or enhanced without departing from the scope and spirit of the claims described below. For example, in one embodiment, the media processor device 106 can stop and/or pause a presentation of the media program at the media device 108 responsive to the product placement event. The media processor device 106 can, later, restart the presentation of the media program after the product advertisement and/or promotional event is completed.

In one embodiment, the product placement database 165 and the product description database 170 can be updated with new product placement entries. Whenever a new media program, which contains a product placement, is produced and/or released for distribution via the media server 130, the product placement database 165 and the product description database 170 can be updated with new information. In one embodiment, a set of product placement data can be released to the product placement database 165 with the release of the media program. In one embodiment, a set of product description data can be released to the product description database 170 with the release of the media program.

In one embodiment, if promotional material for a product placement is changed or updated, then the product description database 170 can be updated with new information. For example, if new images or video content are generated for a product placement promotion, then these items can be released to the product description database 170.

In one embodiment, a user profile at the media processor device 106 can be used to configure product placement promotional events. In one embodiment, the user profile can enable or disable the product placement promotional event function. In one embodiment, the user profile can configure the presentation of the promotional material. For example, the user profile can specify that a promotional advertisement that is triggered by the product placement event can be displayed as a new window that is pop onto the display of the media device 108 or the mobile communication device 116A. The user profile can specify that all promotional advertisements run at the end of media program.

In one embodiment, the promotional material can include a user interface for receiving inputs and/or interaction from the user. For example, promotional material that is triggered by the product placement event can be a website that can receive user interactions. The media processor device 106 and/or the mobile communication device 116A can capture user interactions with the promotional material and can transmit information about these interactions to the media server for sharing with third party advertisers. In one embodiment, the media server 130 can capture the interactions or metrics corresponding to the interactions for sharing with third party advertisers.

Figure 4:
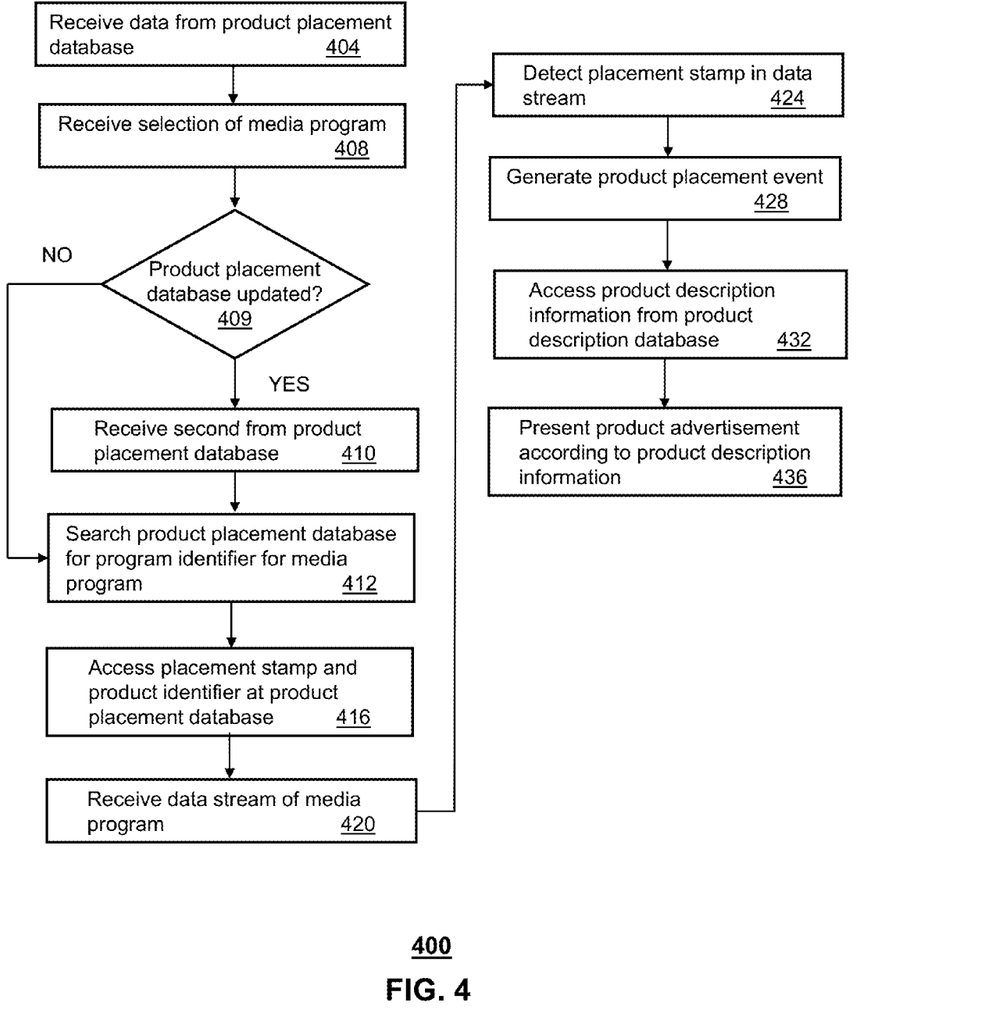
FIG. 4 depicts an illustrative embodiment of a method operating in portions of the system described in FIGS. 1, 5, and 6.
Figure 5:
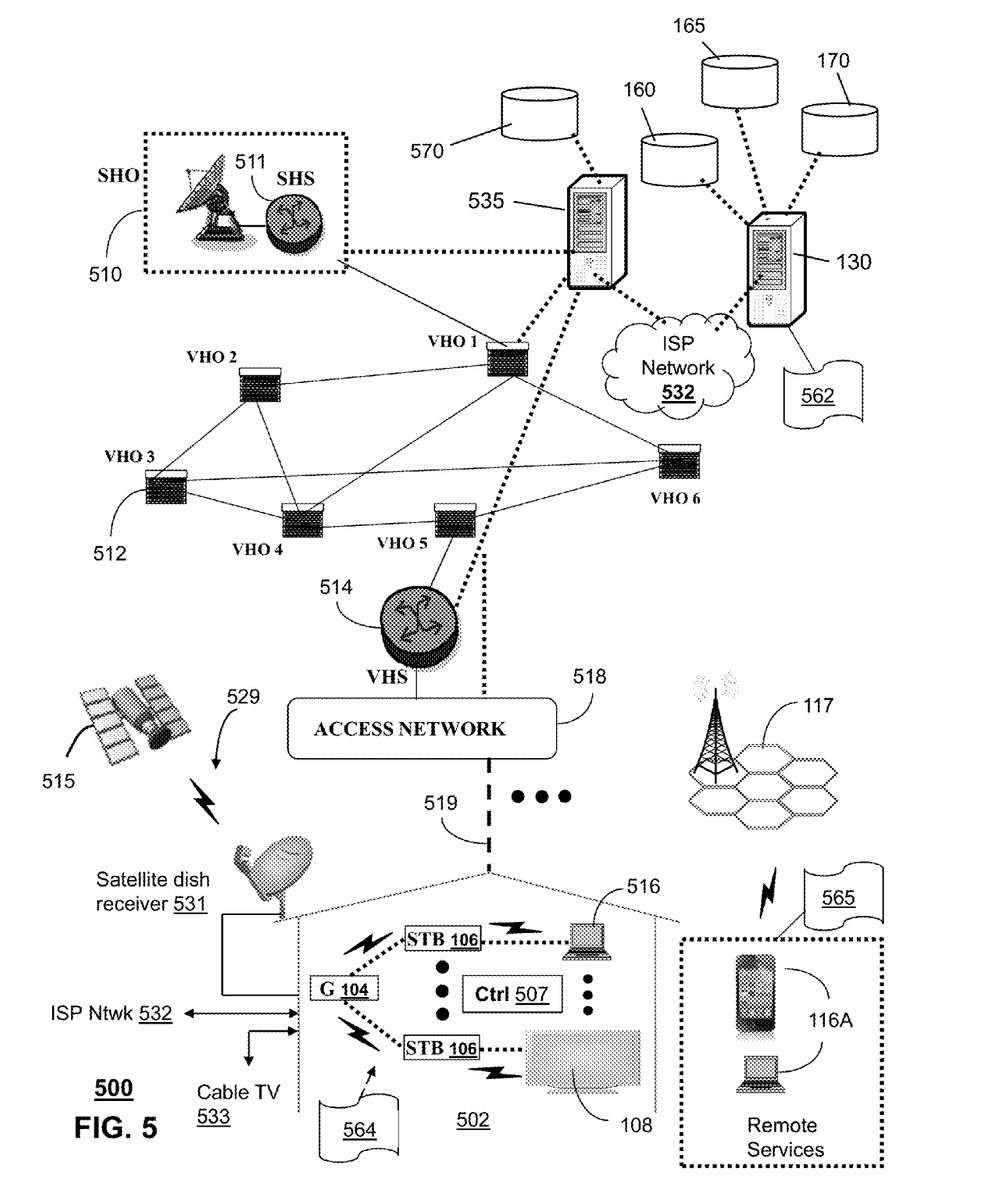
FIGS. 5 and 6 depict illustrative embodiments of communication systems for providing promotional content associated with product placement in media programming according to embodiments illustrated in FIGS. 1, 5, and 6.
Figure 6:
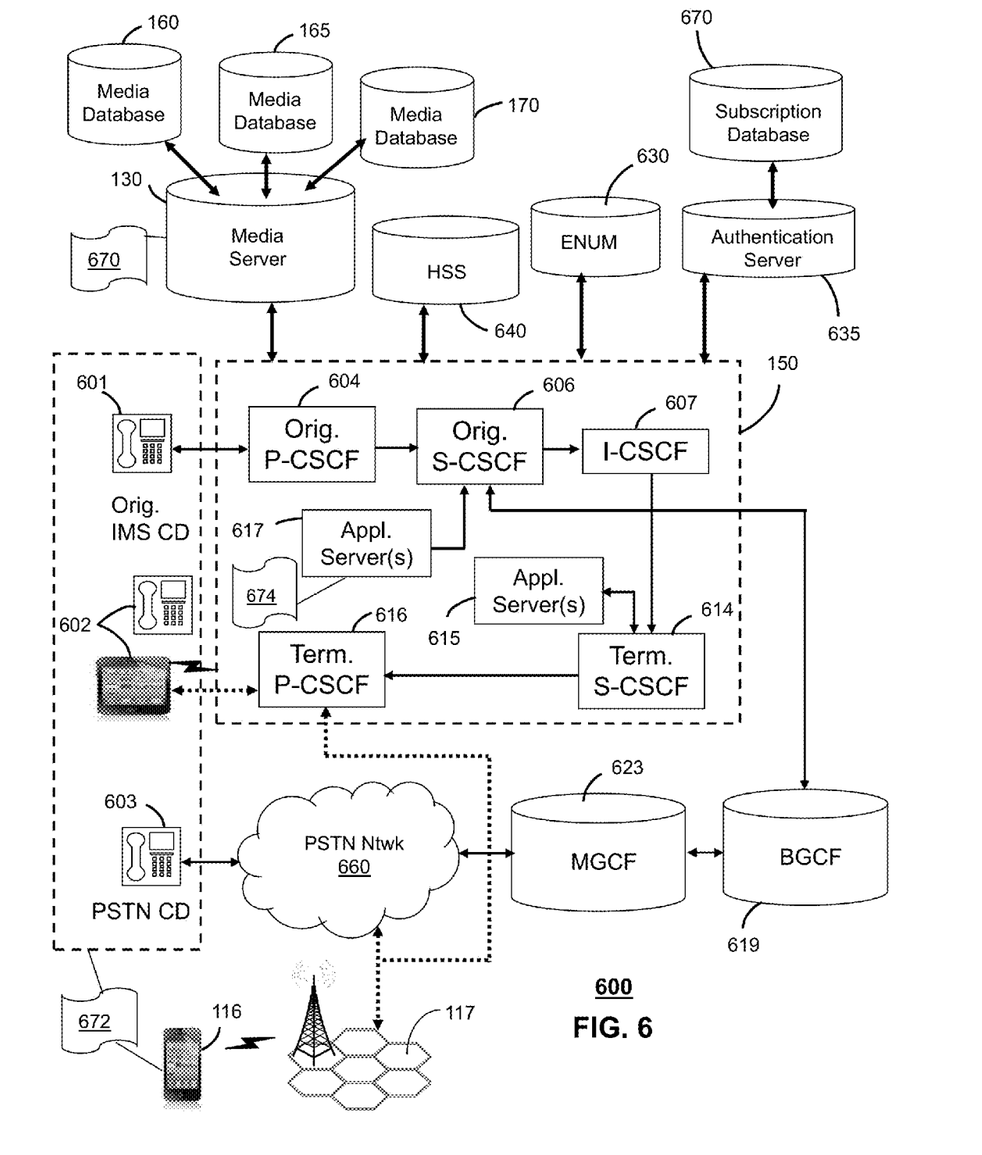

FIG. 4 depicts an illustrative embodiment of a method operating in portions of the system described in FIGS. 1, 5, and 6. Method 400 can begin with step 404, in which a media processor device 106 performs receives a product placement database 165. The product placement database 165 can be transmitted by a media server 130 to the media processor device 106. The media processor device 106 can periodically request a download or an update of the product placement database 165. The product placement database 165 can be transmitted to the media processor device 106 in conjunction with an update of the electronic programming guide information or can be included with the electronic programming guide information.

In step 408, the media processor device 106 can receive a selection of a media program. The media processor device 106 can receive user inputs from a remote control device for selecting a media program or a channel for viewing the media program. The media processor device 106 can present an electronic programming guide at a media device 108 for assisting in the selection of media programming.

In step 412, the media processor device 106 can search the product placement database 165 for a program identifier of the selected media program. The media processor device 106 can determine if a program identifier for the selected media program matches a program identifier in the product placement database 165. If a match is found, the media processor device can further determine if the current date (or a date for recording the media program) matches the air date in the copy of the database 165 at the media processor device 106. If the media processor device 106 matches the media program title and air date, then the media processor device 106 can access records for the matched media program, including a placement stamp and a product identifier, in step 416.

In step 420, the media processor device 106 can receive a data stream for the media program from the media server 130. The media server 130 can send a data stream representing the media program to the media processor device 106. The data stream can be part of multiple data streams that can be routed from the media server 130 to multiple devices in the network 100. The media processor device 106 can receive the data stream and decode the data stream for presentation at the media device 108. In one embodiment, the media processor device 106 can store the data stream in memory if it has been instructed to record the selected media content at a digital video recorder.

In step 424, the media processor device 106 can detect the placement stamp in the data stream for the media program. The media processor device 106 can decode the data stream live and can compare a placement stamp (or time stamp) that was received from the product placement database 165 with a tracked running time for the reproduced media program. The media processor device 106 can determine if the media program has reached the time point, or location, for the product placement.

In step 428, the media processor device 106 can generate a product placement event when the placement stamp is detected. The product placement event can include a product identifier that was received from the product placement database 165. The media processor device 106 can send a product placement event message to an application at the media processor device 106 that handles product placement events. The product placement event handler can send a message to a mobile communication device 116A to notify the mobile communication device 116A of the product placement event. The product placement event handler can call an application at the media processor device 106 to present a promotional advertisement for the product at the media processor device 106.

In step 432, product description information can be accessed from a product description database 170. The mobile communication device 116A can send a message to the media server 130 requesting a search of the product description database 170. The message can include the product identifier that was obtained from the product placement database 165. The media server 130 can search the product description database 170 using the product identifier and can return a product description and/or a product picture to the media communication device 116A. The application at the media processor device 106 can send a message to the media server 130 requesting a search of the product description database 170. The message can include the product identifier that was obtained from the product placement database 165. The media server 130 can search the product description database 170 using the product identifier and can return a product description and/or a product picture to the application at the media processor device 106

In step 436, a product advertisement can be presented according to the product description information. The product description can include a uniform resource locator (URL) for a website that can present promotional information associated with the product. The website can be presented at the media processor device 106. The product description can include video information that can be presented at the media processor device 106. The media processor device 106 can present a product advertisement or promotional event based on the URL and/or video information.

FIG. 5 depicts an illustrative embodiment of a first communication system 500 for delivering media content. The communication system 500 can represent an Internet Protocol Television (IPTV) media system. Communication system 500 can be overlaid or operably coupled with the system of FIG. 1 that can be utilized for presenting promotional content associated with product placement in a media program as another representative embodiment of communication system 500. In one embodiment, the system 500 can include one or more servers 130 and 535 associated with an IMS network 150. In one embodiment, a media server 130 can receive a selection of a media program at a media processor device 106. Data from a product placement database 165 can be searched, based on the media program and air date, to determine a time stamp of a product that has been placed into the media program for promotional purposes. A product placement event can be triggered when the timestamp is reached and can cause access to a product description database 170 for presenting an advertisement for the product that has been placed into the media program.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 318 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 400. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a media server for providing promotional content associated with product placement in media programming for mobile communication devices 116A over the ISP network 532. The media processors 106 and wireless communication devices 116 can be provisioned with software functions 562 and 564, respectively, to utilize the services of media server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 6 depicts an illustrative embodiment of a communication system 600 employing IP Multimedia Subsystem (IMS) network architecture to facilitate the combined services of circuit-switched and packet-switched systems. Communication system 600 can be overlaid or operably coupled with the systems of FIG. 1 or FIG. 5 and communication systems 100 and 500 as another representative embodiment of communication systems 100 and 500. In one embodiment, the system 600 can include a media server 130 that can receive a selection of a media program at a media processor device 106. Data from a product placement database 165 can be searched, based on the media program and air date, to determine a time stamp of a product that has been placed into the media program for promotional purposes. A product placement event can be triggered when the timestamp is reached and can cause access to a product description database 170 for presenting an advertisement for the product that has been placed into the media program.

Communication system 600 can comprise a Home Subscriber Server (HSS) 640, a tElephone NUmber Mapping (ENUM) server 630, and other network elements of an IMS network 150. The IMS network 150 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication systems 100 and 500 of FIGS. 1 and 5, respectively.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 117, a femtocell, a WiFi router, a Digital Enhanced Cordless Telecommunications (DECT) base unit, or another suitable wireless access unit to establish communications with the IMS network 150 of FIG. 6. The cellular access base station 117 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 117 may communicate directly with the IMS network 150 as shown by the arrow connecting the cellular base station 117 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 6 can be operably coupled to the second communication system 600 for purposes similar to those described above. Media server 130 can perform function 670 and thereby provide media services to the CDs 601, 602, 603 and 605 of FIG. 6. CDs 601, 602, 603 and 605, which can be adapted with software to perform function 672 to utilize the services of the media server 130. Media server 130 can be an integral part of the application server(s) 617 performing function 674, which can be substantially similar to function 562 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
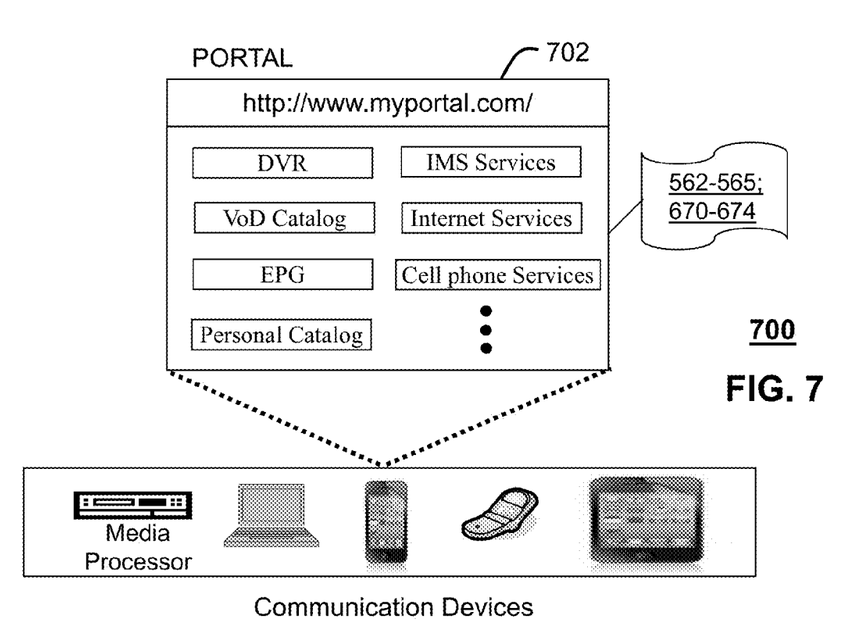
FIG. 7 depicts an illustrative embodiment of a web portal for configuring a media server and/or a media processor device for providing promotional content associated with product placement in media programming according to the communication systems of FIGS. 1, 5, and 6.

FIG. 7 depicts an illustrative embodiment of a web portal 702 which can be hosted by server applications operating from the media server devices 130 of the communication system 100 illustrated in FIG. 1. Communication system 700 can be overlaid or operably coupled with communication system 100, and/or communication system 500, and/or communication system 600 as another representative embodiment of system of FIG. 1, communication system 500, and/or communication system 600. In one embodiment, the communication system 700 can perform as a portal for configuring operations of a media server 130 and/or a media processing device 106. In one embodiment, a media server 130 can receive a selection of a media program at a media processor device 106. Data from a product placement database 165 can be searched, based on the media program and air date, to determine a time stamp of a product that has been placed into the media program for promotional purposes. A product placement event can be triggered when the timestamp is reached and can cause access to a product description database 170 for presenting an advertisement for the product that has been placed into the media program.

The web portal 702 can be used for managing services of communication systems 100, 500, and/or 600. A web page of the web portal 702 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1, 3, and 6. The web portal 702 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 702 can also be used for provisioning IMS services described earlier, provisioning Internet services, provisioning cellular phone services, and so on.

The web portal 702 can further be utilized to manage and provision software applications 562-565, and 670-674 to adapt these applications as may be desired by subscribers and service providers of communication systems 100, 600, and/or 700.

Figure 8:
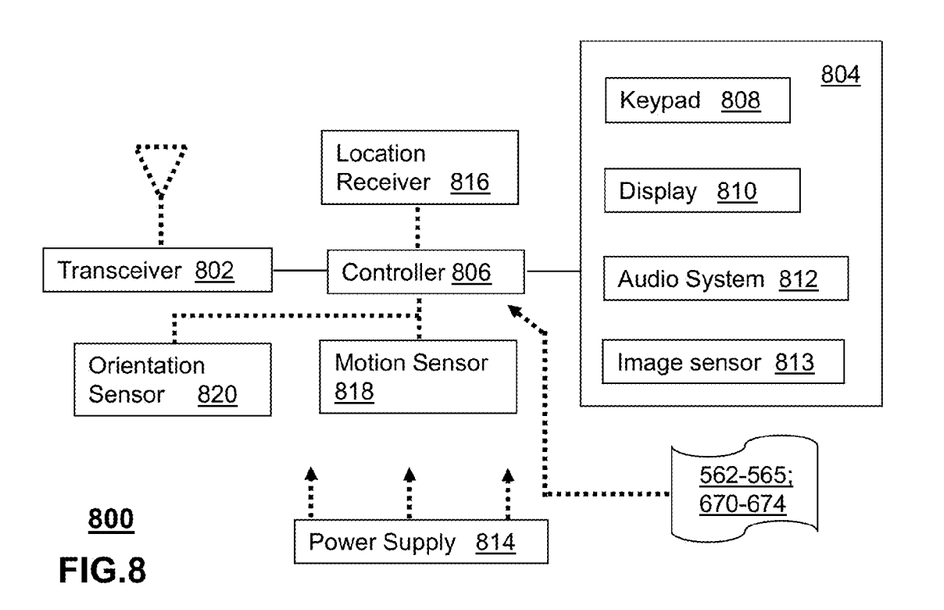
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 5, and 6. In one embodiment, the communication device 800 can be a mobile communication device 116A that communicates with a media server 130. In one embodiment, a media server 130 can receive a selection of a media program at a media processor device 106. Data from a product placement database 165 can be searched, based on the media program and air date, to determine a time stamp of a product that has been placed into the media program for promotional purposes. A product placement event can be triggered when the timestamp is reached and can cause access to a product description database 170 for presenting an advertisement for the product that has been placed into the media program.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 106, the media devices 108, or the portable communication devices 116A of FIG. 1, as well as the IMS CDs 601-602 and PSTN CDs 603-605 and mobile communication devices 116A of FIG. 6. It will be appreciated that the communication device 800 can also represent other devices that can operate in communication systems 500-600 of FIGS. 5-6 such as a gaming console and a media player.

The communication device 800 shown in FIG. 8 or portions thereof can serve as a representation of one or more of the devices of the communication system 100 of FIG. 1, the communication system 500 of FIG. 5, and the communication system 600 of FIG. 6. In addition, the controller 806 can be adapted in various embodiments to perform the functions 562-565 and 670-674, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
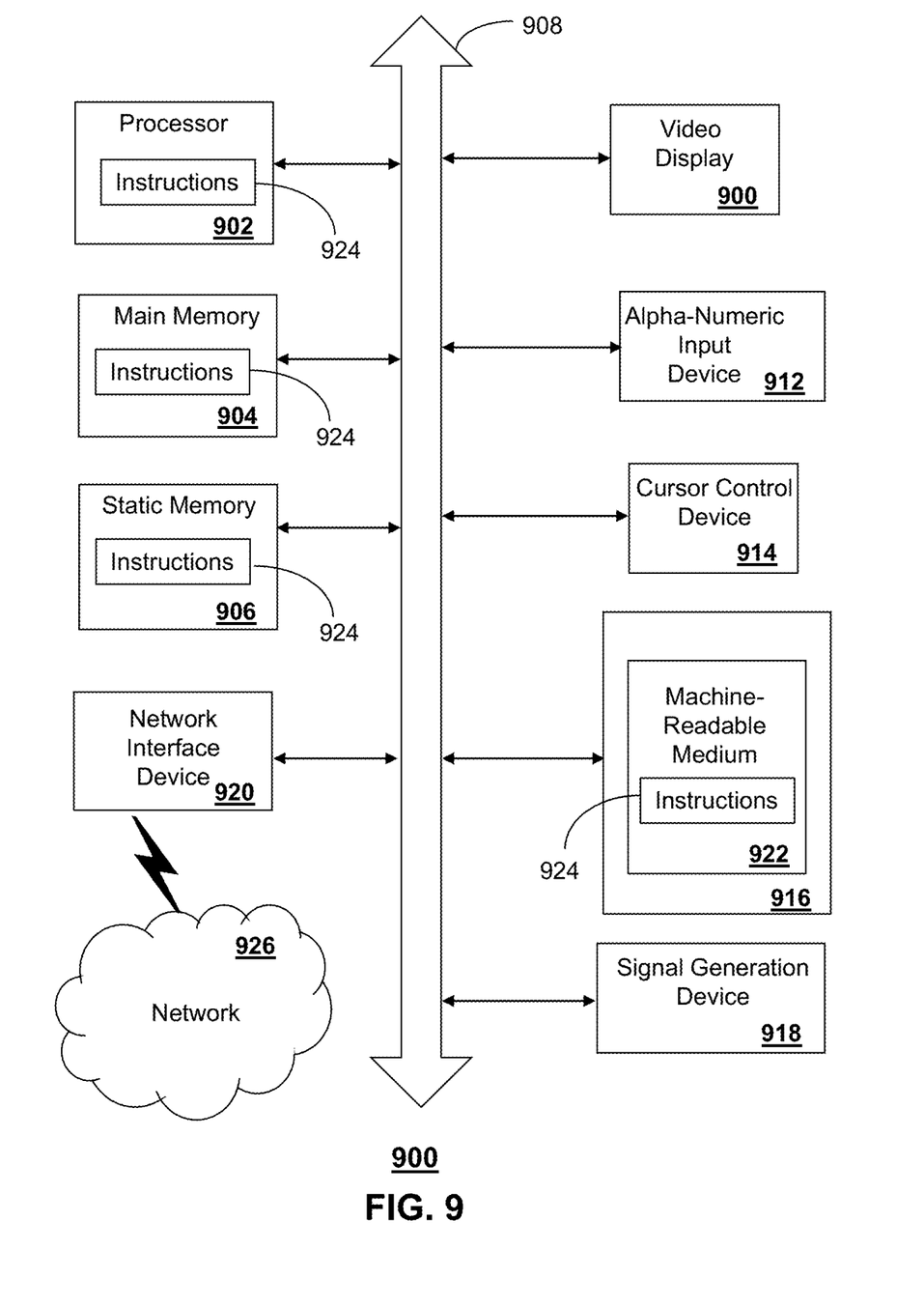
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the media server 130, mobile communication device 116A, gateway device 104A-D, and/or media processor 106 of FIGS. 1, 5, and 6. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory to store executable instructions; and
a processor communicatively coupled to the memory, wherein the processor, responsive to executing the executable instructions, performs operations comprising:
receiving first data associated with a product placement database from a network to provision local product placement data;
receiving a selection of a media program from a user interface;
determining whether the local product placement data requires updating responsive to the receiving of the selection;
receiving second data associated with the product placement database from the network to update the local product placement data responsive to the local product placement data requiring updating;
searching the local product placement data according to a program identifier associated with the media program;
accessing a placement stamp and a product identifier from an entry matching the program identifier in the local product placement data, wherein the placement stamp identifies an occurrence of a product in the media program and wherein the occurrence is not an explicit advertisement;
receiving a data stream of the media program from the network;
detecting the placement stamp in the data stream;
generating a product placement event comprising the product identifier according to the detecting of the placement stamp;
transmitting a message to a mobile communication device, wherein the message comprises a notification of the product placement event and the product identifier, wherein a product description database is accessed by the mobile communication device according to the product identifier, and wherein promotional material from the product description database is presented at the mobile communication device;
receiving product advertising information associated with the product description database according to the product identifier, wherein the product advertising differs from what the product advertising would have been if the local product placement data had not been updated; and
presenting a product advertisement at a display according to the product advertising information.

2. The device of claim 1, wherein the update in the local product placement data causes the placement stamp to change from a first time value identifying a first occurrence in the media program of a first product to a second time value identifying the occurrence in the media program of the product and wherein the first occurrence is not explicitly advertising.

3. The device of claim 2, wherein the product advertisement information differs from prior advertisement information that would have been retrieved from the product description database using a prior product identifier included in the first data of the product placement database.

4. The device of claim 2, wherein the product differs from the first product.

5. The device of claim 1, wherein the product advertising information associated with the product description database is periodically updated.

6. The device of claim 1, wherein the processor further performs operations comprising:
presenting the media program at the display according to the data stream; and
pausing the presenting of the media program according to the detecting of the placement stamp.

7. The device of claim 1, wherein user interactions with the promotional material are captured by the mobile communication device.

8. The device of claim 7, wherein the user interactions that are captured are transmitted by the mobile communication device to a server.

9. The device of claim 1, wherein the presenting of the product advertisement further comprises performing operations comprising connecting to a website.

10. The device of claim 1, wherein the program identifier comprises an keyword associated with the media program.

11. The device of claim 1, wherein the processor further performs operations comprising:
storing the data stream of the media program at the memory as a recorded copy of the media program; and
accessing the recorded copy of the media program, wherein the placement stamp is detected in the data stream during playback of the data stream from the recorded copy.

12. The device of claim 1, wherein the processor further performs operations comprising:
accessing a user profile for the device; and
determining a configuration for the presenting of the product advertisement according to the user profile.

13. The device of claim 1, wherein the processor further performs operations comprising:
accessing a user profile for the device; and
determining a disable mode for the product advertisement according to the user profile, wherein the presenting of the product advertisement is disabled according to the disable mode.

14. The device of claim 1, wherein the processor further performs operations comprising:
capturing interactions with the product advertisement; and
transmitting information associated with the interactions over the network.

15. A computer-readable storage device, comprising executable instructions that, responsive to being executed by a processor, cause the processor to perform operations comprising:
  searching a product placement database according to a program identifier associated with a selected media program;
  accessing a placement stamp and a product identifier from the product placement database matching the program identifier, wherein the placement stamp identifies an occurrence of a product in the media program, wherein the occurrence is not an explicit advertisement;
  detecting the placement stamp in a data stream representing the media program;
  generating a product placement event comprising the product identifier according to the detecting of the placement stamp;
  transmitting a message to a mobile communication device, wherein the message comprises a notification of the product placement event and the product identifier, wherein a product description database is accessed by the mobile communication device according to the product identifier, and wherein promotional material from the product description database is presented at the mobile communication device;
  searching the product description database according to the product identifier, wherein the product description database has been updated;
  receiving product advertising information matching the product identifier in an entry of the product description database, wherein the product description database has been updated so data the product advertising information differs from what the product advertising information would have been if the product description database had not been updated; and
  presenting a product advertisement at a display according to the product advertising information.

16. The storage device of claim 15, wherein the executable instructions further cause the processor to perform operations comprising:
  presenting the media program at the display according to the data stream; and
  pausing the presenting of the media program according to the detecting of the placement stamp.

17. The storage device of claim 15, further comprising executable instructions that cause the processor to perform operations comprising:
  storing the data stream as a recorded copy of the media program; and
  accessing the recorded copy of the media program, wherein the placement stamp is detected in the data stream during playback of the data stream from the recorded copy.

18. A method, comprising:
  receiving, by a system comprising a processor, a product placement event that is triggered by a placement stamp in a media program, wherein the placement stamp identifies an occurrence of a product in the media program, and wherein the occurrence is not an explicit advertisement;
  transmitting, by the system, a message to a mobile communication device, wherein the message comprises a notification of the product placement event and a product identifier, wherein a product description database is accessed by the mobile communication device according to the product identifier, and wherein promotional material from the product description database is presented at the mobile communication device;
  searching, by the system, the product description database according to the product identifier of the product placement event; and
  receiving product advertising information matching the product identifier in an entry of the product description database, wherein the product description database has been updated, and wherein the product advertising information differs from what the product advertising information would have been if the product description database had not been updated; and
  presenting, by the system, a product advertisement according to the product advertising information.

19. The method of claim 18, wherein the product advertisement comprises an interactive application, and further comprising:
  capturing, by the system, interactions with the interactive application; and
  transmitting, by the system, information associated with the interactions over a network.

20. The method of claim 18, further comprising:
  accessing, by the system, a user profile; and
  determining, by the system, a preferred mode for presenting the product advertisement according to the user profile.

* * * * *